United States Patent [19]

Koning

[11] 4,296,639
[45] Oct. 27, 1981

[54] FREE ROTOR GYRO WITH THREE TORQUERS AND THREE PICKOFFS

[75] Inventor: Menno G. Koning, Dover, Mass.

[73] Assignee: Northrop Corporation, Los Angeles, Calif.

[21] Appl. No.: 112,870

[22] Filed: Jan. 16, 1980

[51] Int. Cl.³ .................. G01C 19/28; G01C 19/30
[52] U.S. Cl. ............................ 74/5.46; 74/5.6 E
[58] Field of Search .............. 74/5.46, 5.6 D, 5.6 E, 74/5.8, 5 F

[56] References Cited

U.S. PATENT DOCUMENTS

| | | | |
|---|---|---|---|
| 2,981,113 | 4/1961 | Erdley | 74/5.4 |
| 3,354,726 | 11/1967 | Krupick et al. | 74/5.6 D X |
| 3,428,789 | 2/1969 | Richard | 235/150.25 |

FOREIGN PATENT DOCUMENTS 2372412 6/1978 France .................. 74/5.6 E

Primary Examiner—Rodney H. Bonck
Attorney, Agent, or Firm—Kenway & Jenney

[57] ABSTRACT

A dynamically tuned free rotor gyro is equipped with a set of three case-fixed torquers equally spaced circumferentially about the drive axis beneath the rotor. Three pickoffs are arranged diametrically opposite the corresponding torquers beneath the rotor. The outputs of the three pickoffs are combined to produce a vector rebalance signal, which is nulled by the effect of the torquers. The vector rebalance signal is resolved into three separate control signals for the corresponding torquer drive circuits.

12 Claims, 6 Drawing Figures

4,296,639

FREE ROTOR GYRO WITH THREE TORQUERS AND THREE PICKOFFS

BACKGROUND OF THE INVENTION

The invention relates generally to gyros and inertial sensing systems, and more particularly to free rotor gyros with means applying torque to reposition the rotor through circumferentially distributed torquers.

A free rotor gyro requires a spinning rotor suspended in a case which can be turned or moved without affecting the angular orientation of the rotor axis (called "spin axis") with respect to inertial space.

In one type of free rotor gyro, a rotor in the form of an outer inertial ring is pivotally connected to an inner gimbal ring which in turn is orthogonally pivotally connected to a central drive shaft. The axis of rotation of the drive shaft is fixed relative to the case. When used as a "strap-down" gyro for vehicular attitude reference, the case (and thus the drive axis) are fixed to a vehicle such as a space craft; the rotor is free relative to the vehicle but fixed relative to inertial space. The rotor gimbal ring and drive shaft are initially coaxial and the rotor and gimbal may be thought of as occupying the same nominal plane. When the case is reoriented to another position, the drive axis makes an angle with the spin axis. Because of the orthogonal pivots, the plane of the gimbal ring alternates between the new plane of the rotor and the plane normal to the drive axis twice per revolution. The accelerating torques which continually reorient the gimbal ring are transmitted to the rotor as small "wobble" torques, proportional to the rotor angle and the square of the spin rate.

This relationship is used to advantage in a "dynamically tuned" free rotor gyro which employs torsional flexures for the pivots. The spring torques of the flexures proportionally resist deflection and are exactly matched at a uniquely determined spin rate by the antispring effect of the wobble torques. Dynamic cancellation decouples the rotor spin axis from the case.

In the strap-down gyro, discrete circumferentially distributed torquers are used to constantly reposition the rotor to the normal plane whenever the case turns. Normally there are four D'Arsonval coil type or solenoid type torquers beneath the rotor paired on orthogonal axes. Corresponding pickoffs are also mounted to the case beneath the rotor to sense deflection. The torquer current, controlled by a rebalance servo network responsive to the pickoffs, is sensed and processed to determine angular rate about any two mutually orthogonal input axes that are located in a plane perpendicular to the spin axis.

The positioning of the four pickoffs relative to the four torquers is critical. With D'Arsonval type torquer coils, the pickoffs are typically centered with respect to the segmental arc of a corresponding coil. However, with solenoid torquers, the axes on which the pickoffs are arranged are typically shifted 45° relative to the torquer axes to make use of the extra space. In either case, it is difficult to have the pickoffs diametrically opposite from the torquers at the same radial distance.

SUMMARY OF THE INVENTION

The general purpose of the invention is to simplify the design of the torquer and pickoff system for a free rotor gyro or dynamically tuned gyro. The specific object is to reduce the number of torquers and pickoffs to a minimum number in order to optimize the design of a free rotor gyro or dynamically tuned gyro.

It has been discovered that coplanar torquers and pickoffs can be used in sets of three instead of four. Thus in the preferred embodiment, torquers are coplanarly spaced 120° apart beneath the rotor. Pickoffs are mounted coplanarly diametrically opposite to the corresponding torquers. Thus the circumferential spacing between adjacent pickoffs and torquers is 60°. The resulting simplification enables an overall size reduction in the gyro and facilitates axis alignment since corresponding torquers and pickoffs are in line. Moreover, inherent plane definition by three points facilitates gap uniformity between the rotor and each of the sets of torquers or pickoffs.

BRIEF DESCRIPTION OF THE DRAWING

Other objects, features, and advantages of the invention will appear from the following description of the preferred embodiment thereof, taken together with the accompanying drawings, in which.

DESCRIPTION OF THE PREFERRED EMBODIMENT

Figure 1:
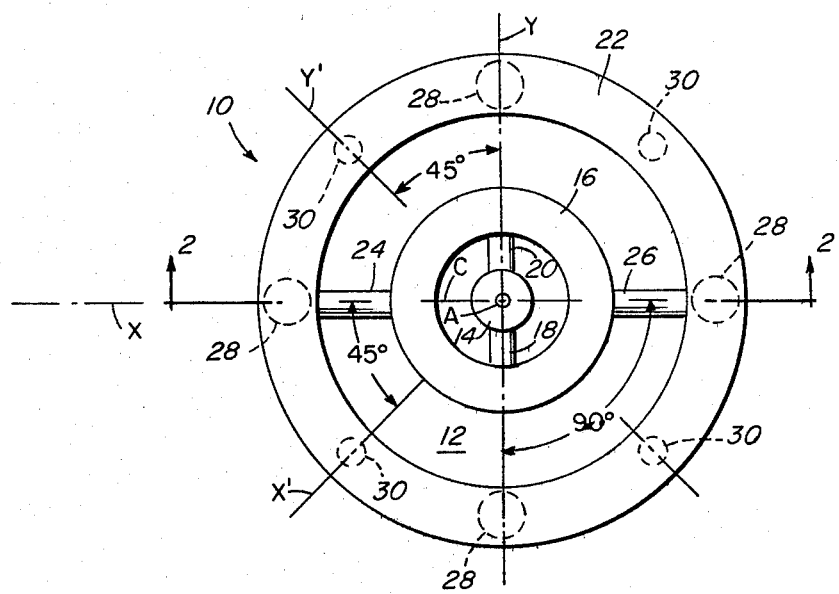
FIG. 1 is a plan view of a conventional free rotor gyro showing the torquers and pickoffs in phantom according to the prior art arrangement.
Figure 2:
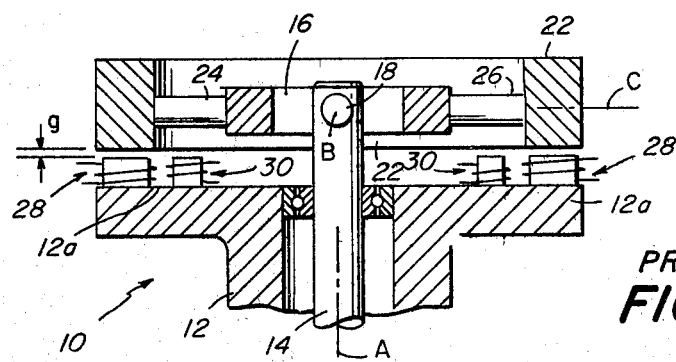
FIG. 2 is a partial sectional view of the conventional gyro taken along lines 2—2 of FIG. 1.

FIGS. 1 and 2 depict a prior art dynamically tuned gyro 10, the various elements of which are mounted on a frame 12 which is fixed with respect to a case (not shown). A central drive shaft 14 is journalled in the frame 12 for rotation about the drive axis A powered by an AC hysteresis type motor housed within the case (not shown). One end of the drive shaft 14 extends beyond the frame 12 to pivotally support an inner gimbal ring 16 nominally coaxial with the drive axis A and supported along a perpendicular pivot axis B by means of aligned diametral torsional flexures 18 and 20. The inner gimbal ring 16 supports the outer ring-shaped soft iron rotor 22, the principal inertial element of the gyro, which is nominally coaxial with the drive axis A. The rotor 22 is supported by diametral flexures 24 and 26 connected to the inner gimbal ring along a pivot axis C and nominally orthogonal to the drive axis A. The frame 12 provides an annular platform 12a below the lower surface of the rotor 22. Four solenoid type torquers 28 are equally spaced radially from the drive axis and circumferentially 90° apart about the platform 12a beneath the rotor 22. Thus the torquers 28 are arranged on case-fixed orthogonal axes X and Y as shown in FIG. 1. Pivot axes B and C are constantly rotating with respect to the drive axis A.

Each solenoid torquer 28 includes a soft iron core and an energizing winding. Electrical current flowing in the winding magnetizes the core and attracts the rotor. Because the rotor is not permanently magnetized, the solenoid torquers cannot repel the rotor but can only attract it.

Arranged on orthogonal axes X' and Y' shifted 45° from the torquer axes, four pickoffs 30 are equally spaced radially and circumferentially on the platform 12a beneath the rotor 22 between the torquers 28. Each pickoff 30 includes an iron core carrying a primary and a secondary winding. The reluctance path associated with each core consists mainly of the air gap that separates the upper surface of the core from the flux return path of the rotor. Thus the field set up at a primary winding and linking the secondary winding is mainly a function of the air gap length. The voltage induced in the secondary winding is a direct measure of the distance separating the rotor from the core. The secondary windings of the two diametrically opposite pickoffs, for example on the X' axis, are connected in series opposition. Note that angular motions of the rotor plane about the case-fixed axis X' affect the pickoffs which lie on the orthogonal axis Y' in a complementary fashion. Likewise deflection about the Y' axis affects only the pickoffs which lie on the X' axis. Deflection about any other axis will affect all of the pickoffs simultaneously except that pairs of opposite pickoffs are still affected complementarily in the prior art system.

Figure 3:
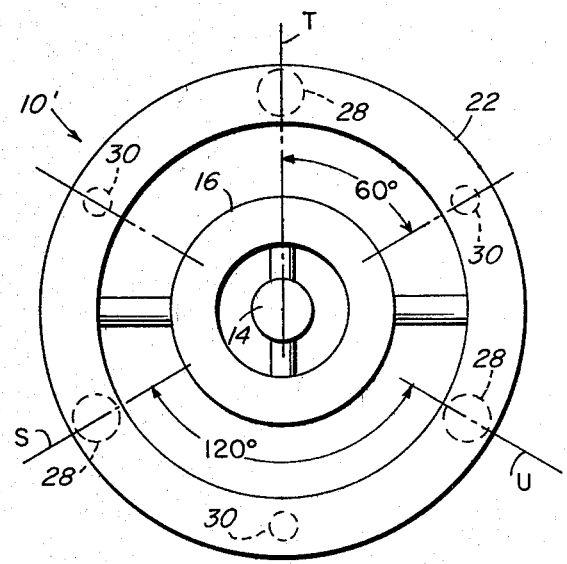
FIG. 3 is a plan view of a dynamically tuned gyro having the torquer and pickoff arrangement according to the invention.

FIG. 3 illustrates a dynamically tuned free rotor gyro having only three solenoid torquers 28 and three variable reluctance type pickoffs 30. The individual torquer and pickoff elements 28 and 30 as well as the other structural elements of the gyro may be similar in form to that of the prior art gyro shown in FIGS. 1 and 2. The three torquers 28 are equally spaced radially and circumferentially (120° apart) on the platform 12a of the frame beneath the rotor 22. The pickoffs 30 are positioned on the platform 12a beneath the rotor 22 diametrically opposite from the corresponding torquers 28 along common torquer/pickoff axes S, T, and U. The spacing between adjacent pickoffs and torquers is 60° instead of 45° as shown in FIG. 1.

Figure 4:
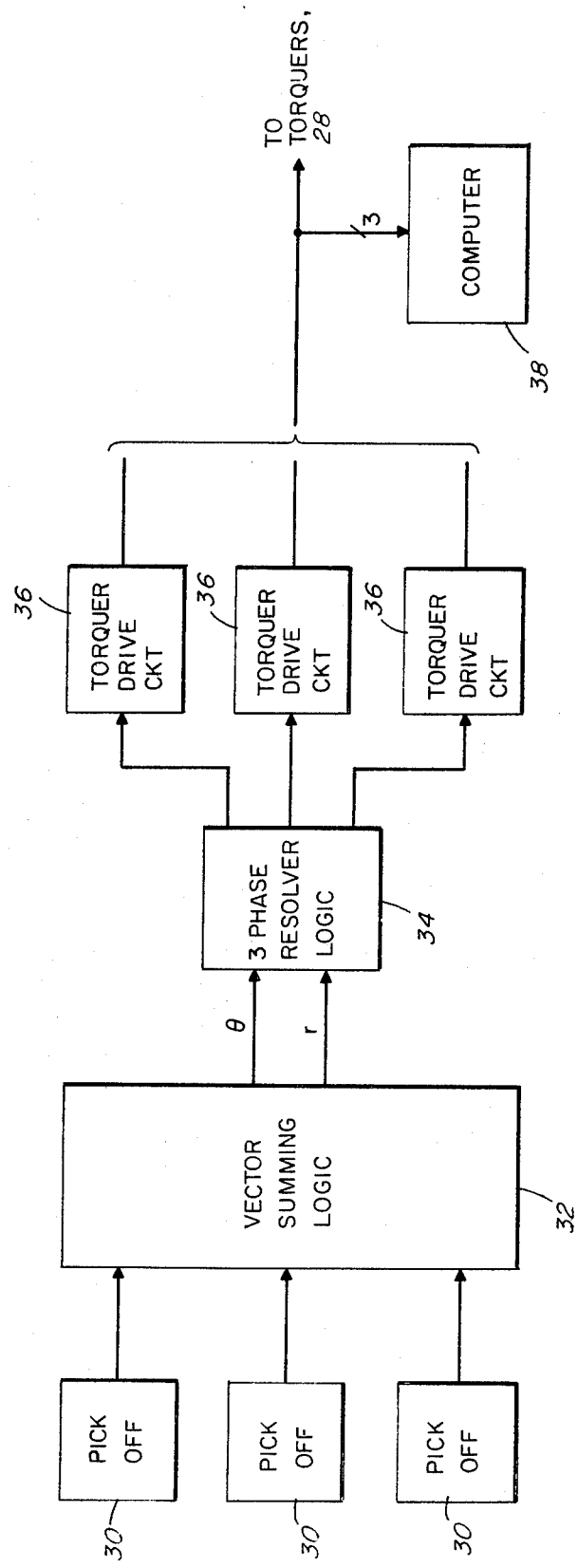
FIG. 4 is a block diagram of the torquer servomechanism for the gyro of FIG. 3.

FIG. 4 is a functional block diagram showing the basic organization of the servoloop which senses deflection of the rotor spin axis and returns the rotor to the normal plane. The output signals from the individual pickoffs 30 are applied to vector summing logic 32 which combines the pickoff signals in a logic network to resolve the axis of rotor displacement. The output of the vector summing logic 32 is the sum vector of the three pickoff outputs representing an error signal. The vector is represented by its angle $\theta$ and magnitude r. The three-phase resolver logic 34 receives the error vector and divides it into three output signals of the proper magnitude to respective torquer drive circuits 36. The outputs of the torquer drive circuits 36 are applied directly to the corresponding torquers 28 and also form the outputs of the gyro to the navigational computer 38. If necessary, the computer 38 is programmed to convert the three-phase data into conventional coordinates.

Figure 5:
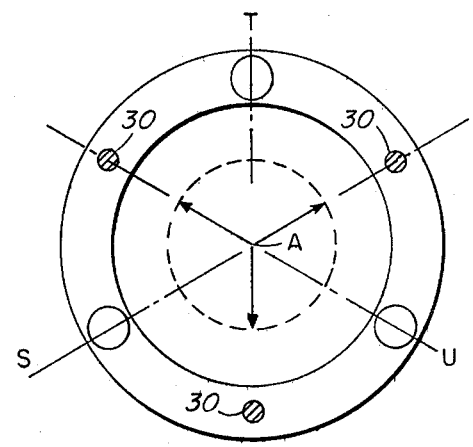
FIG. 5 is a vector diagram illustrating the outputs of the pickoffs of the gyro of FIG. 3 when the rotor is in the normal plane.

When the rotor is in its nominal position in the normal plane, the air gap between each pickoff 30 and the rotor is identical such that the output signals of the pickoffs 30 are of equal magnitude as shown in FIG. 5. The output signal strengths are represented by the vectors lying on the S, T, and U axes. The vectors are identical in absolute value and spaced apart by 120° representing the angular position of the respective pickoffs 30. The vector sum of the three pickoff output vectors in FIG. 5 is zero, i.e., the error signal is nulled.

Figure 6:
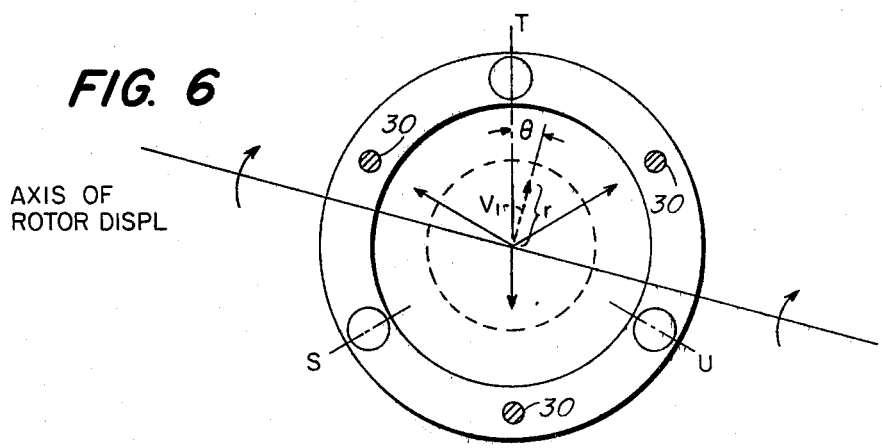
FIG. 6 is a vector diagram of the outputs of the pickoffs when the rotor is displaced about a given axis.

FIG. 6 illustrates the condition of the pickoff output vectors when the rotor is tilted about a given axis. Unless the axis of rotor displacement is coincident with one of the torquer/pickoff axes S, T, or U, the rotor will move closer to two of the pickoffs 30 thus increasing the magnitude of the associated pickoff output vectors. The rotor will move away from the other pickoff 30 thus decreasing the magnitude of the pickoff output vector as shown in FIG. 6. The sum of the three vectors in solid lines in FIG. 6 is the resultant vector $V_1$ indicated by a dashed line at angle $\theta$ magnitude r. The orientation of the resultant vector is nominally perpendicular to the instantaneous axis of rotor displacement. Thus the angle $\theta$ identifies the rotor displacement axis. This is also the axis about which the rotor must be turned to return the rotor to the normal plane. The resultant vector output of the summing logic 32 in FIG. 4 is processed by the three-phase resolver logic 34 to produce current control signals for the corresponding torquers 28. The individual control signals to the torquer drive circuits are such that the torques applied to the rotor combine to produce a net resultant torque which forces the rotor to return to its null position.

There are many inherent advantages to using torquers and pickoffs in sets of three instead of four. Several advantages derive from reducing the part count by one torquer and one pickoff. Because there are only six parts to arrange around the drive axis in the area beneath the rotor, the 15° wider circumferential spacing permits the diameter of the rotor and hence the size of the gyro case to be reduced. Moreover, the associated driver circuits of the torquers are reduced from four to three. Since all of the vector summing and resolving is done outside of the gyro, there are fewer interwinding connections within the gyro case, thus enhancing reliability. In the prior art two-axis system, separate servo loops were used for each axis. That is, the pickoff outputs were processed to provide error signals relative to the X and Y axes. In the preferred three-axis system the pickoff outputs are summed to produce a single pickoff output vector thus resulting in a single servo loop with one conventional compensating network instead of two.

Other advantages are found in the alignment of torquers and pickoffs. In the prior art arrangement, pickoffs were positioned on separate axis between the torquer axes. In the three-axis system of the invention, the pickoffs are in line with the respective torquers. This arrangement facilitates the alignment process since the position of the torquer automatically determines the diametrically opposite position of the corresponding pickoff. Moreover, since three points define a unique plane, gap uniformity between the torquer/pickoff magnetics and the rotor is facilitated by the use of sets of three pickoffs and torquers instead of four.

While the preferred embodiment shows a particular form of solenoid torquer, the invention is not necessarily limited to the use of any particular torquer. For example, three D'Arsonval torquers may be used in place of the three solenoid torquers shown in FIG. 3. While the three-axis system is specifically designed for dynamically tuned gyros, it is equally applicable to other types of free rotor gyros. Significantly, the invention is capable not only of substantially reducing the number of intricate parts in the gyro, but also of reducing the overall size of the gyro while achieving higher accuracy and reliability. The trade-off is almost entirely in terms of additional logic circuits outside of the gyro case. Accordingly, from a system standpoint, the three-axis design is highly cost effective.

While a particular preferred embodiment of the present invention has been illustrated in the accompanying drawing and described in detail herein, other embodiments are within the scope of the invention and the following claims.

What is claimed is:

1. In a free gyro having a case, a rotor having an inertial mass distributed about a spin axis, means in said case for imparting constant rotation to said rotor, and means for freely suspending said rotor within said case to make the orientation of the spin axis independent of the orientation of said case over a given range with respect to a nominal reference orientation of said spin axis fixed relative to said case, the improvement comprising torquer means for applying discretely variable forces to said rotor at three coplanar locations fixed with respect to said case and equally spaced circumferentially about the spin axis in said nominal orientation.

2. In a gyro as set forth in claim 1, the further improvement wherein said torquer means comprises a set of three solenoid torquers at said three locations respectively.

3. In a gyro as set forth in claim 1, the further improvement comprising torquer drive circuit means operatively interconnected with said torquer means for controlling the amount of force applied at each said location in response to the orientation of said spin axis relative to said nominal orientation.

4. In a gyro as set forth in claim 3, the further improvement comprising pickoff means for sensing and producing outputs indicative of the elevation of said rotor from a reference plane approximately normal to the nominal orientation of said spin axis at three coplanar pickoff locations fixed with respect to said case and respectively diametrically opposite from corresponding ones of said three torquer means locations.

5. In a gyro as set forth in claim 4, the further improvement wherein said pickoff means comprises a set of three pickoffs mounted in fixed relation to said case at said pickoff locations and equally spaced axially from the rotor in the nominal orientation.

6. In a gyro as set forth in claim 4, the further improvement comprising control means responsive to said pickoff means outputs for producing respective control signals to said torquer drive means when said rotor spin axis departs from said nominal orientation so as to tend to return said rotor spin axis to said nominal orientation.

7. In a gyro as set forth in claim 6, the further improvement wherein said control means comprises means for generating a signal indicative of the axis of deflection of said rotor spin axis from said nominal orientation, and means responsive to the deflection axis signal for producing and applying three output signals to said torquer drive means for causing respective amounts of force to be applied at said torquer means locations to produce a net torque on said rotor in a sense to return the rotor spin axis to the nominal orientation.

8. In a gyro as set forth in claim 3 or 7, the further improvement comprising computer means operatively receiving the outputs of said torquer drive circuit means for determining the angle and axis of deflection of said rotor therefrom.

9. In a dynamically tuned free rotor gyro having a case, a drive shaft mounted for rotation about a drive axis which is fixed relative to said case, a gimbal resiliently connected to said drive shaft about a first pivot axis orthogonal to said drive axis, a rotor with an inertial mass distributed about a spin axis resiliently connected to said gimbal about a second pivot axis at right angles to said first pivot axis, and means in said case for imparting rotation to said rotor at a predetermined rate to decouple said rotor spin axis from said case, the improvement comprising torquer means for applying discretely variable forces to said rotor at three coplanar locations fixed with respect to said case and equally spaced radially from and circumferentially about said drive axis.

10. In a dynamically tuned gyro as set forth in claim 9, the further improvement wherein said torquer means comprises a set of three solenoid torquers at said three locations.

11. In a dynamically tuned gyro as set forth in claim 10, the further improvement comprising pickoff means for sensing and producing outputs indicative of the elevation of said rotor from a reference plane approximately normal to said drive axis disposed at three discrete locations fixed with respect to said case respectively diametrically opposite from corresponding ones of said three torquer means locations.

12. In a dynamically tuned gyro as set forth in claim 11, the further improvement wherein said pickoff means comprises a set of three pickoffs mounted in fixed relation to said case at said pickoff locations and equally spaced axially from the rotor in the nominal orientation of said spin axis.

* * * * *